(12) United States Patent
Pawliczek

(10) Patent No.: US 11,603,215 B2
(45) Date of Patent: Mar. 14, 2023

(54) FLIGHT DIRECTION INDICATION SYSTEM FOR AN AERIAL VEHICLE AND METHOD OF INDICATING A FLIGHT DIRECTION OF AN AERIAL VEHICLE

(71) Applicant: GOODRICH LIGHTING SYSTEMS GMBH, Lippstadt (DE)

(72) Inventor: Carsten Pawliczek, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 485 days.

(21) Appl. No.: 16/710,684

(22) Filed: Dec. 11, 2019

(65) Prior Publication Data
US 2021/0009283 A1 Jan. 14, 2021

(30) Foreign Application Priority Data
Jul. 14, 2019 (EP) .................... 19186181

(51) Int. Cl.
*B64D 47/04* (2006.01)
*B64C 39/02* (2006.01)
*B64D 47/06* (2006.01)

(52) U.S. Cl.
CPC ............ *B64D 47/04* (2013.01); *B64C 39/024* (2013.01); *B64D 47/06* (2013.01); *B64C 2201/027* (2013.01); *B64C 2201/108* (2013.01); *B64C 2201/123* (2013.01)

(58) Field of Classification Search
CPC ...... B64D 47/04; B64D 47/06; B64C 39/024; B64C 2201/027; B64C 2201/108; B64C 2201/123; B64C 27/46
See application file for complete search history.

(56) References Cited

U.S. PATENT DOCUMENTS

| | | | |
|---|---|---|---|
| 4,066,890 A | * | 1/1978 | Hamilton ............... B64D 47/06 398/154 |
| 6,265,984 B1 | | 7/2001 | Molinaroli |
| 7,161,256 B2 | | 1/2007 | Fang |

(Continued)

FOREIGN PATENT DOCUMENTS

| | | |
|---|---|---|
| CN | 205707345 U | 11/2016 |
| WO | 2018137131 A1 | 8/2018 |

OTHER PUBLICATIONS

European Search Report for Application No. 19186181.4-1010, dated Jan. 23, 2020, 12 pages.

*Primary Examiner* — Brian P Sweeney
(74) *Attorney, Agent, or Firm* — Cantor Colburn LLP

(57) ABSTRACT

A flight direction indication system for an aerial vehicle having a plurality of rotors includes: for each of the plurality of rotors, at least one rotor blade having a plurality of light sources arranged along a radial extension of the rotor blade; and a control unit, coupled to the plurality of light sources of the rotor blades of the plurality of rotors. The control unit is configured to effect a coordinated control of the plurality of light sources of the rotor blades of the plurality of rotors, with the coordinated control yielding an image or a sequence of images across the plurality of rotors to an observer of the aerial vehicle and to to control the plurality of light sources of the rotor blades of the plurality of rotors on the basis of a momentary flight direction of the aerial vehicle.

17 Claims, 4 Drawing Sheets

(56) References Cited

U.S. PATENT DOCUMENTS

| | | | |
|---|---|---|---|
| 7,324,016 B1* | 1/2008 | Milgram | B64C 27/023 |
| | | | 340/978 |
| 8,462,354 B2 | 6/2013 | Barnes | |
| 10,068,506 B2 | 9/2018 | Garcia Morchon et al. | |
| 10,109,224 B1 | 10/2018 | Ratti et al. | |
| 2010/0099326 A1 | 4/2010 | De La Torre | |
| 2012/0212712 A1* | 8/2012 | Scanlon | G09F 21/10 |
| | | | 353/121 |
| 2016/0152345 A1 | 6/2016 | Molnar et al. | |
| 2018/0273202 A1* | 9/2018 | Liu | B64C 39/024 |

\* cited by examiner

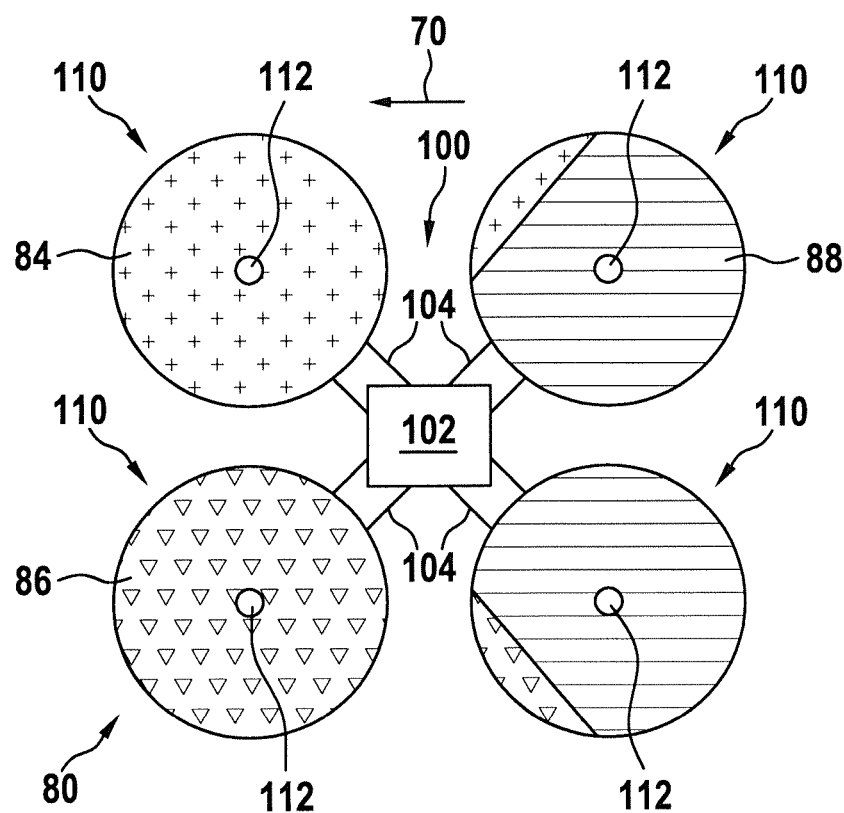
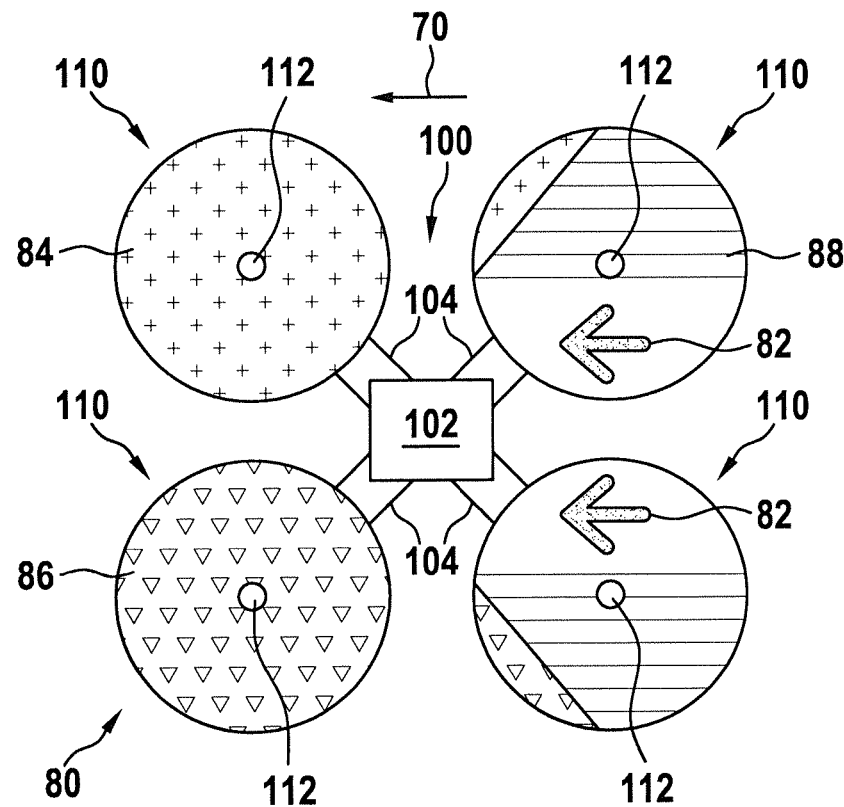

FLIGHT DIRECTION INDICATION SYSTEM FOR AN AERIAL VEHICLE AND METHOD OF INDICATING A FLIGHT DIRECTION OF AN AERIAL VEHICLE

FOREIGN PRIORITY

This application claims priority to European Patent Application No. 19186181.4 filed Jul. 14, 2019, the entire contents of which is incorporated herein by reference.

TECHNICAL FIELD

The present invention is in the field of aerial vehicles having a plurality of rotors, i.e. in the field of multicopters. In particular, the present invention is in the field of unmanned aerial vehicles having a pluralities of rotors, i.e. in the field of drones having multicopter design. Further in particular, the present invention is in the field of lighting systems for aerial vehicles having a plurality of rotors.

BACKGROUND

Recently, the use of drones/multicopters has increased significantly. Advances in the control and coordination of multiple rotors have made multicopters, in particular unmanned aerial vehicles (UAVs) of this kind, significantly more accessible and more reliable. A particularly popular type of unmanned aerial vehicle is a quadrocopter. Various types of multi-rotor unmanned aerial vehicles have been developed, e.g. for recreational purposes, for carrying cameras, etc. Multicopters are further envisioned for the delivery of goods, for other kinds of courier services, and even for transporting people. With the envisioned increase in drone traffic, flight safety is likely to become an increasing concern.

Accordingly, it would be beneficial to provide a system and a method for increasing the flight safety of multicopters, in particular of unmanned aerial vehicles having a plurality of rotors. Further in particular, it would be beneficial to provide a system and a method that allow for an enhanced safety of remotely operated multicopters.

SUMMARY

Exemplary embodiments of the invention include a flight direction indication system for an aerial vehicle (UAV) having a plurality of rotors, the flight direction indication system comprising: for each of the plurality of rotors, at least one rotor blade comprising a plurality of light sources arranged along a radial extension of the rotor blade; and a control unit, coupled to the plurality of light sources of the rotor blades of the plurality of rotors; wherein the control unit is configured to effect a coordinated control of the plurality of light sources of the rotor blades of the plurality of rotors, with the coordinated control yielding an image or a sequence of images across the plurality of rotors to an observer of the aerial vehicle; and wherein the control unit is configured to control the plurality of light sources of the rotor blades of the plurality of rotors on the basis of a momentary flight direction of the aerial vehicle, with said image or said sequence of images comprising a flight direction indication, indicative of the momentary flight direction of the aerial vehicle.

Exemplary embodiments of the invention allow for the use of the rotors of the aerial vehicle/multicopter as a sort of screen that provides a visual flight direction indication to an observer. With the coordinated control of the plurality of light sources of the rotor blades of the plurality of rotors, a substantially still image or a sequence of images, such as in the form of a video-type sequence of images or in the form of a dynamic LED news ticker, may be provided to an observer of the aerial vehicle. In this way, when remotely controlling the aerial vehicle, for example when controlling the aerial vehicle via a remote control from the ground, the person handling the aerial vehicle is provided with feedback about the momentary flight direction of the aerial vehicle. Also, other persons, such as operators of other aerial vehicles or any other kind of people who happen to be in the vicinity of the aerial vehicle, are provided with information about the momentary flight direction of the aerial vehicle. In this way, operators of other aerial vehicles and other people are more aware of the air space occupied by the aerial vehicle, carrying the flight direction indication system, and more aware of the air space that the aerial vehicle is travelling into. In this way, the risk of collisions among aerial vehicles/multicopters and collisions between aerial vehicles/multicopters and other air-bourne or ground-operated vehicles may be reduced. The provision of a visual flight direction indication, indicative of the momentary flight direction of the aerial vehicle, provides for an increase in information about the path of travel of the aerial vehicle and thus may provide for an increase in flight safety regarding the air space in question. With multicopters being highly agile aerial vehicles, capable of quickly and repeatedly changing their flight direction, the flight direction indication system, as described herein, is highly effective in improving air space safety. The flight direction indication may be an intuitively understandable symbol, such as an arrow, or a color-coded flight direction indication or any other suitable type of visual flight direction indication, as will be described in more detail below.

The aerial vehicle may be an unmanned aerial vehicle or a manned aerial vehicle, such as an air taxi, having multicopter design.

The aerial vehicle may be a remote controlled aerial vehicle, such as a remote controlled drone of the multicopter type.

The control unit is configured to effect a coordinated control of the plurality of light sources of the rotor blades of the plurality of rotors. In particular, the control unit is configured to switch the plurality of light sources of the rotor blades of the plurality of rotors on and off. Further in particular, the control unit is configured to switch the plurality of light sources on/off in quick succession, depending on their position during the rotation of the rotor blades. The switching on/off in quick succession means that the control unit is capable of providing a location-selective illumination of the light sources during the rotation of the rotor blades. In particular, the control unit is capable of providing a quick control of the light sources, as compared to the time frame the rotor blade requires for a single rotation. In a particular embodiment, the control unit may be capable of achieving a resolution of at least 50 pixels, in particular of at least 100 pixels, along the trajectory of the light source in question during one rotation of the rotor blade.

Above described coordinated control yields an image or sequence of images across the plurality of rotors to an observer of the aerial vehicle. While the rotor blades and the light sources, arranged along the radial extentions of the rotor blades, move at such a high speed during operation of the aerial vehicle that an observer cannot follow their motion, the coordinated control yields a substantially still image or a sequence of images that is recognisable as such to the human eye. The processing speeds of the human eye and the human brain are decisive for the reception of the output of the light sources as an image/as a sequence of images. The coordinated control operates to provide a meaningful flight direction indication to a human observer, i.e. to an observer having the processing capabilities of a human eye and a human brain. The flight direction indication is therefore indicative of the momentary flight direction of the UAV to a human observer. The type of screen, as provided across the plurality of rotors by the coordinated control of the plurality of light sources of the rotor blades of the plurality of rotors, is a screen in the human observer's frame of reference.

According to a further embodiment, the plurality of rotors of the aerial vehicle are substantially in one plane. In this way, the plurality of rotors form an extended screen, on which the image or the sequence of images may be provided to the observer. While the word screen is used herein, it is understood that no conventional screen in the form of a rectangular structure is meant. Rather, the screen described herein is comprised of a plurality of disc-shaped sub-screens, with each of those sub-screens having the extension of the area covered by the rotor blades of the respective rotor during rotation.

The flight direction indication system comprises at least one rotor blade for each of the plurality of rotors that comprises a plurality of light sources arranged along a radial extension of the rotor blade. With each rotor blade of a rotor making full turns in operation, equipping one rotor blade per rotor with a plurality of light sources may be sufficient for providing the image/sequence of images with the desired flight direction indication. It is also possible that a subset of the rotor blades or all of the rotor blades of a rotor in question comprise a plurality of light sources arranged along a radial extension of the rotor blade, respectively. In this way, a brighter and/or higher resolution image/sequence of images may be provided. It is also possible that the plurality of rotors are equipped differently in terms of the plurality of light sources. For example, for each of the plurality of rotors, it is possible that one rotor blade or a subset of the rotor blades or all rotor blades comprise a plurality of light sources arranged along a radial extension of the respective rotor blade. The term rotor blade describes an extended structure from the rotor hub to a rotor blade tip. It is possible that the rotors of the aerial vehicle are rotors with two rotor blades, where the two rotor blades may be embodied as a single structure, being attached to the rotor hub, or as two separate structures, being separately attached to the rotor hub.

According to a further embodiment, the plurality of light sources are arranged along more than 50%, in particular along more than 70%, further in particular along between 70% and 90%, of the radial extension of the rotor blade. In this way, the area covered by the trajectory of the rotor blade can be used to a large extent for providing the flight direction indication. This feature may apply to one rotor blade for each of the plurality of rotors or to a subset of rotor blades for each of the plurality of rotors or to all rotor blades for each of the plurality of rotors.

According to a further embodiment, the plurality of light sources comprise light sources of different colors. In this way, multi-color flight direction indications may be provided to the observer of the aerial vehicle. In particular, a momentary forward portion of the aerial vehicle may light up differently than a momentary rearward portion of the aerial vehicle. Also, it is possible to use different colors for different phases of the flight. This feature may apply to one rotor blade for each of the plurality of rotors or to a subset of rotor blades for each of the plurality of rotors or to all rotor blades for each of the plurality of rotors.

According to a further embodiment, the light sources of different colors are provided at various locations along the radial extension of the rotor blade. It is possible that various groups of light sources are provided at various locations along the radial extension of the rotor blade, with each group comprising light sources of different colors. In this way, multi-color pixels may be provided across the area covered by the trajectory of the rotor blade during rotation.

According to a further embodiment, the plurality of light sources comprise light sources of at least three different colors. In an exemplary embodiment, the plurality of light sources may comprise red, green and white light sources. In a further exemplary embodiment, the plurality of light sources may comprise red, green and blue light sources. In a yet further exemplary embodiment, the plurality of light sources may comprise red, green, blue and white light sources.

According to a further embodiment, at least 50 groups of light sources of different colors, in particular at least 100 groups of light sources of different colors, are provided along the radial extension of the rotor blade.

According to a further embodiment, the plurality of light sources are a plurality of LEDs. This feature may apply to one rotor blade for each of the plurality of rotors or to a subset of the rotor blades for each of the plurality of rotors or to all rotor blades for each of the plurality of rotors. With LEDs being small light sources and with LEDs having comparably low power demands, the LEDs may be integrated into the rotor blades in a particularly convenient manner. Also, LEDs are highly reliable and have quick response times, when commanded by the control unit to light up/extinguish.

According to a further embodiment, the plurality of light sources, in particular the plurality of LEDs, are embedded into the rotor blade. In particular, the light sources may be embedded into the rotor blade in such a way that their outer structure blends into the airfoil shape of the rotor blade. For example, the plurality of light sources may be arranged along the radial extension of the rotor blade in a strip configuration, with a transparent protective cover shielding the light sources from the environment and blending into the airfoil shape of the rotor blade.

According to a further embodiment, the flight direction indication system further comprises a blade position sensor for each of the plurality of rotors, the blade position sensor being capable of sensing the position of the rotor blade during rotation. In this way, the momentary position and/or rotation speed of the rotor blade, being equipped with the plurality of light sources, may be determined in a particularly accurate manner. This in turn allows for the provision of a particularly accurate visual flight direction indication via the control of the plurality of light sources. As compared to deducing the position of the rotor blade via the rotation control of the respective rotor, sensing the blade position allows for obtaining the blade position in a more direct manner. The blade position sensor may be a two-piece position sensor, having a first piece attached to the rotor blade in question and having a second piece attached to a rotor support arm carrying the rotor in question. The blade position sensor may be a Hall sensor or an optical sensor or any other kind of blade position sensor that allows for determining a passage of the rotor blade along the rotor support arm.

According to a further embodiment, the control unit is coupled to the plurality of light sources of the rotor blades of the plurality of rotors via at least on wireless transmission link or via a plurality of sliding contacts. In case a wireless transmission link is used, the control unit may broadcast the control for all light sources in a single command set, with each of the plurality of light sources or each of the rotor blades, carrying light sources, filtering out the relevant parts of the command set. It is also possible that the control unit has separate wireless transmission links to the rotor blades, carrying light sources, or to the light sources. The separate transmission links may be logically separated transmission links according to a suitable wireless transmission protocol. While the usage of one or more wireless transmission links keeps the wiring within the aerial vehicle low, the wireless transmission link(s) may be susceptible to electromagnetic interference. The provision of a plurality of sliding contacts between the control unit and the rotor blades, carrying the light sources, may allow for a more reliable distribution of control commands from the control unit to the plurality of light sources. Also, using sliding contacts for coupling the control unit to the plurality of light sources may obviate the need for dealing with regulatory constraints regarding wireless transmission frequencies.

According to a further embodiment, the flight direction indication system further comprises a flight direction sensor for detecting the momentary flight direction of the aerial vehicle. The flight direction sensor may be coupled to the control unit and may provide a flight direction signal, indicative of the momentary flight direction, to the control unit. By providing a flight direction sensor as part of the flight direction indication system, the flight direction indication system is autonomous in terms of controlling the plurality of light sources depending on the momentary flight direction of the aerial vehicle.

According to a further embodiment, the flight direction indication system further comprises a flight direction signal input for receiving a flight direction signal indicative of the momentary flight direction of the aerial vehicle. The flight direction signal input may be part of the control unit of the flight direction indication system. The flight direction signal may be received from a flight control unit of the aerial vehicle. In this way, the control unit of the flight direction indication system may receive the momentary flight direction of the aerial vehicle from an external entity that has said information readily available. In this way, no additional hardware for determining the momentary flight direction of the aerial vehicle in necessary.

According to a further embodiment, said image comprises at least one arrow, pointing substantially in the momentary flight direction of the aerial vehicle. The terminology of the at least one arrow pointing substantially in the momentary flight direction of the aerial vehicle includes the case of the momentary flight direction being projected onto the plane spanned by the plurality of rotors. In other words, the at least one arrow may be substantially aligned with the horizontal component of the momentary flight direction of the aerial vehicle. The provision of at least one arrow as the visual flight direction indication may provide for a very intuitive communication of the momentary flight direction to an observer. The symbol of an arrow may be immediately associated with a direction indication by the observer.

The at least one arrow may in particular be at least one yellow arrow. The color yellow may draw a high level of attention to the aerial vehicle. Also, the color yellow is not associated with other in-flight signalling in the aircraft field. In this way, a reliable distinction between other aircraft and unmanned aerial vehicles, equipped with exemplary embodiments of the flight direction indication system, may be made possible.

According to a further embodiment, said image comprises a green sector in a right forward direction with respect to the momentary flight direction of the aerial vehicle, a red sector in a left forward direction with respect to the momentary flight direction of the aerial vehicle, and a white sector in a rearward direction with respect to the momentary flight direction of the aerial vehicle. In this way, the flight direction indication may resemble the red, white, and green navigation lighting of civilian air planes. In this way, for an observer of the aerial vehicle, the flight direction indication may be in line with the expected color codes for other aircraft. An intuitive determination of the flight direction of the aerial vehicle may be provided to a skilled observer of air traffic.

The green sector may be provided in an angular range of between 0° and 110° towards the right with respect to the momentary flight direction, the red sector may be provided in an angular range of between 0° and 110° towards the left with respect to the momentary flight direction, and the white sector may be provided in an angular range of 140° around a straight rearward direction, i.e. in a sector of 140° around the direction opposing the momentary flight direction of the aerial vehicle.

According to a further embodiment, for each of the plurality of rotors, the at least one rotor blade comprises the plurality of light sources on a bottom side of the rotor blade. In this way, the flight direction indication may be immediately communicated to observers of the aerial vehicle on the ground.

According to a further embodiment, for each of the plurality of rotors, the at least one rotor blade comprises the plurality of light sources on a top side of the rotor blade. In this way, the flight direction indication is effectively communicated to observers above the aerial vehicle, such as pilots of small recreational air planes. The provision of the plurality of light sources on the bottom side of the rotor blade may be combined with providing a second plurality of light sources on the top side of the rotor blade.

Exemplary embodiments of the invention further include an aerial vehicle comprising a plurality of rotors and a flight direction indication system, as described in any of the embodiments above. The additional features, modifications, and effects, as described above with respect to the flight direction indication system, apply to the aerial vehicle in an analogous manner. The aerial vehicle may be an unmanned aerial vehicle or a manned aerial vehicle, such as an air taxi, having multicopter design.

According to a further embodiment, the aerial vehicle comprises between 3 and 10 rotors, in particular between 4 and 8 rotors, further in particular 4 rotors or 8 rotors. The latter numbers of rotors refer to the aerial vehicle being a quadrocopter or octocopter.

Exemplary embodiments of the invention further include a method of indicating a flight direction of an aerial vehicle having a plurality of rotors, with each of the plurality of rotors having at least one rotor blade comprising a plurality of light sources arranged along a radial extension of the rotor blade, the method comprising: controlling the plurality of light sources of the rotor blades of the plurality of rotors in a coordinated manner, with the coordinated control yielding an image or a sequence of images across the plurality of rotors to an observer of the aerial vehicle; and controlling the plurality of light sources of the rotor blades of the plurality of rotors on the basis of a momentary flight direction of the aerial vehicle, with said image or said sequence of images comprising a flight direction indication, indicative of the momentary flight direction of the aerial vehicle. The additional features, modifications, and effects, as described above with respect to the flight direction indication system for an aerial vehicle, apply to the method of indicating a flight direction of an aerial vehicle in an analogous manner. The aerial vehicle may be an unmanned aerial vehicle or a manned aerial vehicle, such as an air taxi, having multicopter design.

According to a further embodiment, the plurality of light sources comprise light sources of different colors, in particular light sources of at least three different colors. The method comprises controlling the plurality of light sources of the rotor blades of the plurality of rotors to yield a multi-color image or a multi-color sequence of images across the plurality of rotors to an observer of the aerial vehicle.

According to a further embodiment, the method comprises controlling the plurality of light sources of the rotor blades of the plurality of rotors to yield an image comprising at least one arrow, in particular at least one yellow arrow, pointing substantially in the momentary flight direction of the aerial vehicle.

According to a further embodiment, the method comprises controlling the plurality of light sources of the rotor blades of the plurality of rotors to yield an image comprising a green sector in a right forward direction with respect to the momentary flight direction of the aerial vehicle, a red sector in a left forward direction with respect to the momentary flight direction of the aerial vehicle, and a white sector in a rearward direction with respect to the momentary flight direction of the aerial vehicle.

BRIEF DESCRIPTION OF THE DRAWINGS

Further exemplary embodiments of the invention are described below with reference to the enclosed drawings, wherein:

FIG. 6 shows an unmanned aerial vehicle in accordance with an exemplary embodiment of the invention in a schematic bottom view, with the flight direction indication system showing yet another exemplary flight direction indication;

FIG. 7 shows an unmanned aerial vehicle in accordance with an exemplary embodiment of the invention in a schematic bottom view, with the flight direction indication system showing yet another exemplary flight direction indication.

DETAILED DESCRIPTION

Figure 1:
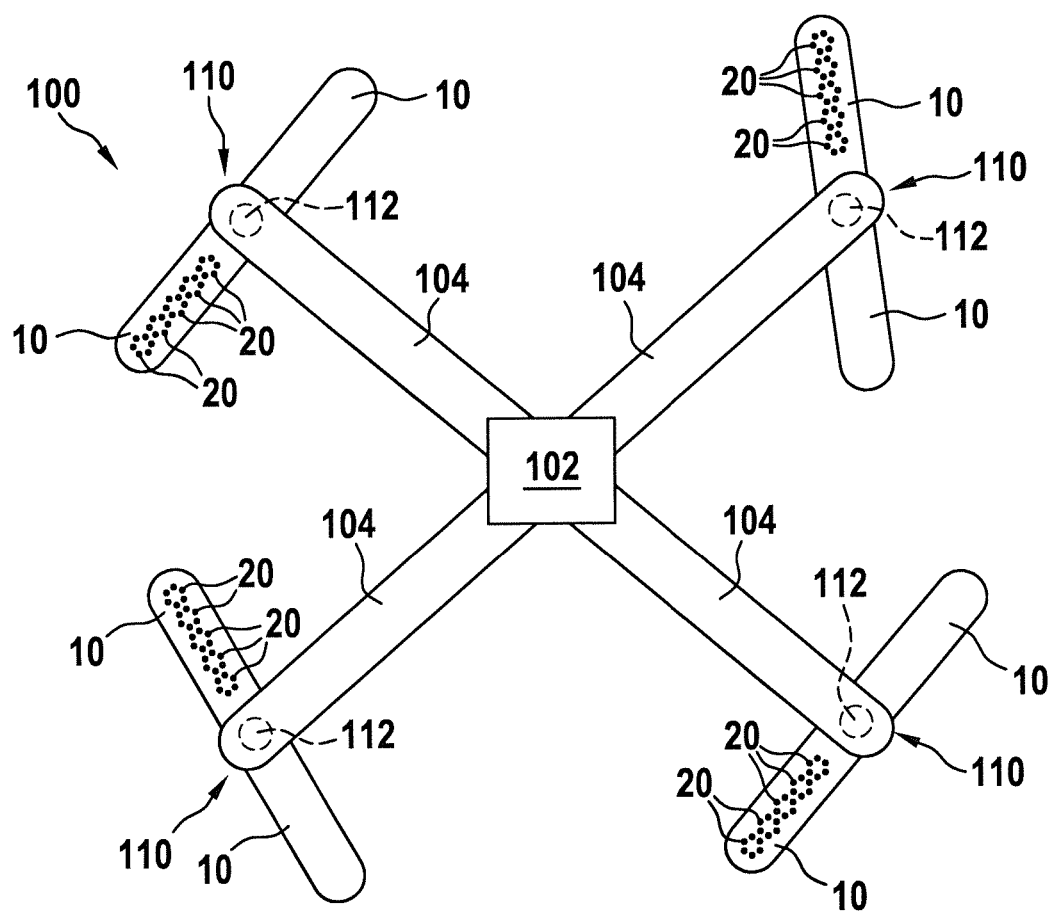
FIG. 1 shows an unmanned aerial vehicle in accordance with an exemplary embodiment of the invention in a schematic top view.

FIG. 1 shows an unmanned aerial vehicle 100 in accordance with an exemplary embodiment of the invention in a schematic top view. The unmanned aerial vehicle (UAV) 100, which may also be referred to as a drone 100, is a quadrocopter in the exemplary embodiment of FIG. 1, i.e. it has four rotors. It is also possible that the UAV has a smaller or larger number of rotors, such as eight rotors, thus operating as an octocopter.

While FIG. 1 and the ensuing FIGS. 2 to 7 relate to unmanned aerial vehicles of the multicopter type as exemplary embodiments of the invention, it is understood that the described aerial vehicles may also be manned aerial vehicles of the multicopter type, such as air taxis of the multicopter type.

The UAV 100 has a vehicle body 102. The vehicle body 102 may be provided for carrying utilities or delivery goods or any other kind of goods to be carried. The UAV 100 comprises four rotor support arms 104, with each of the four rotor support arms 104 being attached to the vehicle body 102. Each of the four rotor support arms 104 supports a rotor 110.

Each of the four rotors 110 has a rotor hub 112 and two rotor blades 10. In the exemplary embodiment of FIG. 1, the two rotor blades 10 are formed as an integrated structure and are attached to the rotor hub 112 as a single integrated element. As this integrated structure has two separate air foils for providing lift to the UAV 100, the rotor blades 10 are referred to as two rotor blades 10. Overall, the four rotors 110 of the UAV 100 each have two rotor blades 10 in the exemplary embodiment of FIG. 1. It is pointed out that the rotors 110 may have a larger number of rotor blades as well.

In operation, the rotor blades 10 rotate around the rotor hub 112 and provide lift to the UAV 100. The rotating speed of the rotor blades 10 of the rotors 110 are controlled by a flight control unit of the UAV 100. By adapting the relative rotation speeds of the four rotors 110, the UAV 100 is steerable and can be flown into desired flight directions. The mechanics of flying and steering a UAV are known to the skilled person.

Each of the four rotors 110 has one rotor blade 10 that carries a plurality of LEDs 20 along its radial extension. In the exemplary embodiment of FIG. 1, five LEDs 20 per rotor blade 10 are depicted. It is understood that a smaller or larger number of LEDs may be provided along the radial extension of the rotor blade 10. In the exemplary embodiment of FIG. 1, the LEDs 20 are of the same color. For example, all LEDs 20 may be yellow LEDs or white LEDs. However, it is also possible that LEDs of different colors are provided, as will be explained below.

During rotation of the rotor blades 10, the LEDs 20 travel to different positions in the UAV frame of reference. A time-selective illumination of the LEDs 20 may therefore result in a location-selective illumination to an observer of the UAV 100, and an image may be provided to an observer of the UAV 100. The details of the resulting image, providing a flight direction indication to the observer, will be described below with respect to FIGS. 4 to 7.

In the exemplary embodiment of FIG. 1, the LEDs 20 are provided on the lower surface of the rotor blades 10. They are therefore shown in phantom in FIG. 1. As a consequence, the flight direction indication, effected by the time-selective illumination of the LEDs 20, is provided to observers of the UAV on the ground. As an alternative/in addition, LEDs may also be provided on top of the rotor blades 10.

Figure 2:
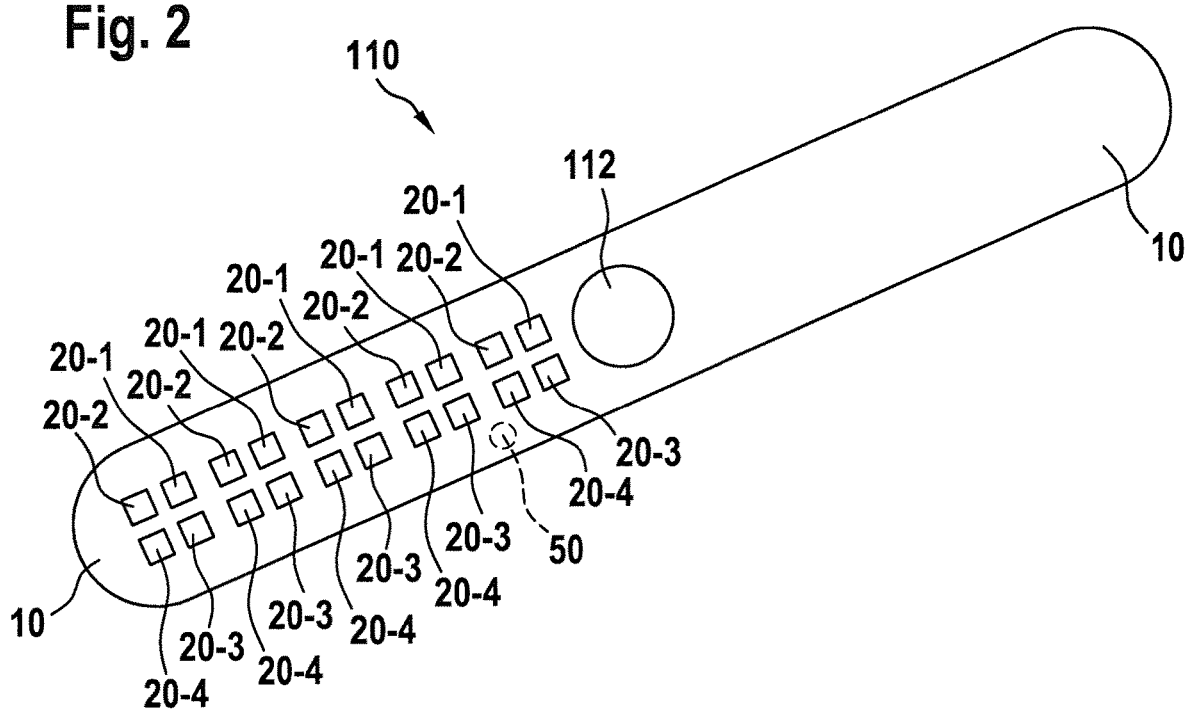
FIG. 2 shows a rotor of an unmanned aerial vehicle in accordance with an exemplary embodiment of the invention in a schematic bottom view.

In the exemplary embodiment of FIG. 1, the LEDs 20 are provided on exactly one rotor blade 10 per rotor 110. However, it is also possible that the LEDs 20 are provided on both rotor blades 10 of each rotor 110. In case of more rotor blades being present per rotor, the LEDs may also be provided on more than two rotor blades. FIG. 2 shows a rotor 110, as may be employed in unmanned aerial vehicles in accordance with exemplary embodiments of the invention, in a schematic bottom view. The rotor 110 has a rotor hub 112 and two rotor blades 10. As described above with respect to FIG. 1, the two rotor blades 10 are formed in an integrated manner, with the integrated structure being rotatably attached to the rotor hub 112.

One of the rotor blades 10 supports a plurality of LEDs. In particular, the rotor blade 10 in question supports five groups of LEDs, with each group of LEDs having LEDs of four different colors. As a result, the rotor blade 10 comprises five red LEDs 20-1, five green LEDs 20-2, five blue LEDs 20-3, and five white LEDs 20-4. The LEDs of each color are arranged along the radial extension of the rotor blade 10. With each group of LEDs having a red LED 20-1, a green LED 20-2, a blue LED 20-3, and a white LED 20-4, a wide range of colors may be emitted per LED group. Each LED group travels along a circular trajectory around the rotor hub 112. Via time-selective control of the LEDs of different colors, location-selective illumination with different colors along said circular trajectory may be achieved.

The rotor blade 10, carrying the plurality of LEDs, further comprises a blade position sensor 50, one component of which is shown in FIG. 2. The depicted component of the blade position sensor 50 is provided on the top surface of the rotor blade 10 in the exemplary embodiment of FIG. 2 and is therefore shown in phantom in FIG. 2. The depicted component of the blade position sensor 50 may be a permanent magnet or a specific color LED or a specific color paint or any other suitable identifier. When passing the rotor support arm, the depicted component of the blade position sensor 50 is detected by a second component of the blade position sensor 50, arranged on the rotor support arm. In this way, the current position of the rotor blade 10 can be directly and immediately determined. The two components may be a permanent magnet and a magnetic detector, an LED and an optical detector, etc.

Figure 3:
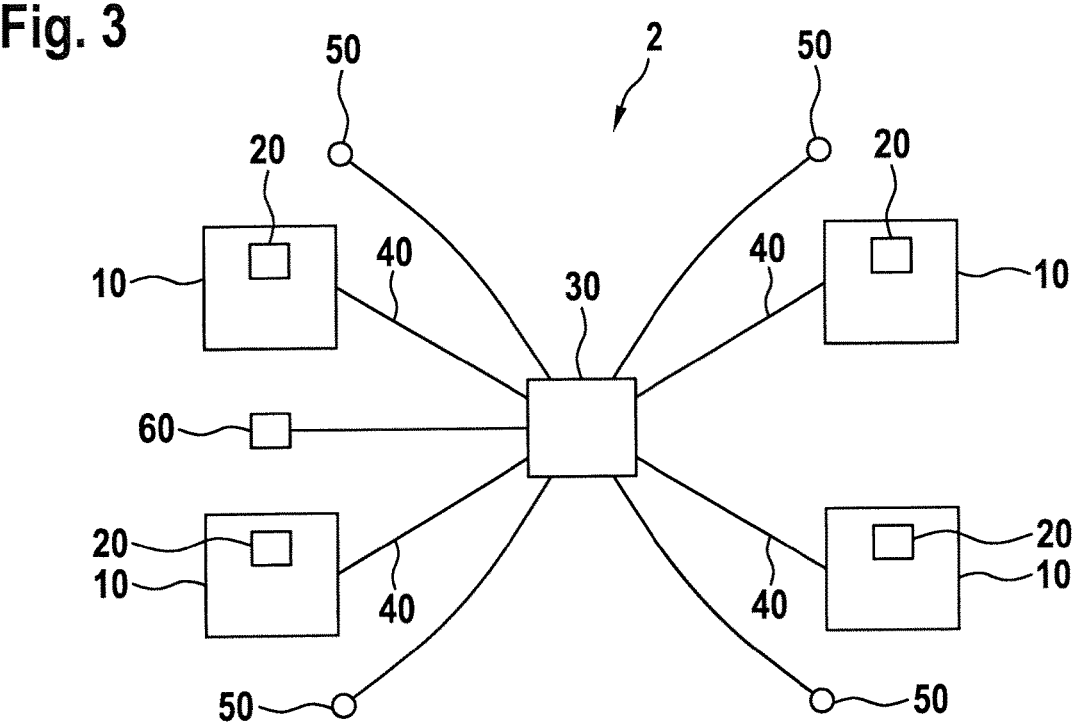
FIG. 3 shows a flight direction indication system in accordance with an exemplary embodiment of the invention in a block diagram.

FIG. 3 shows a flight direction indication system 2 in accordance with an exemplary embodiment of the invention in a block diagram. The flight direction indication system 2 comprises four rotor blades 10, which belong to four different rotors, with each of the four rotor blades 10 having a plurality of light sources 20. The flight direction indication system 2 further comprises a control unit 30 for controlling the plurality of light sources 20 of each of the rotor blades 10.

In the exemplary embodiment of FIG. 3, the control unit 30 is coupled to the four rotors 10 in a wired manner, with the wired connection being indicated by lines 40 in FIG. 3. The control unit 30 is stationary in the UAV frame of reference. It may be arranged in the vehicle body of the UAV. The connections 40 may comprise a wire section in the vehicle body and the rotor support arm and a sliding contact between the rotor support arm and the rotor blade 10. A second wire section may be provided from the sliding contact between the rotor support arm and the rotor blade 10 to the plurality of light sources 20.

The flight direction indication system 2 further comprises a blade position sensor 50 for each of the rotor blades 10. The blade position sensors are coupled to the control unit 30, e.g. via wired links. The control unit 30 is thus provided with current position information of the rotor blades 10 of the four rotors.

The flight direction indication system 2 further comprises a fight direction sensor 60 that is capable of determining the momentary flight direction of the unmanned aerial vehicle. The flight direction sensor 60 is coupled to the control unit 30. In this way, the control unit 30 is provided with the momentary flight direction of the UAV to which the flight direction indication system 2 is installed.

In addition/as an alternative, the control unit 30 may have a flight direction signal input for receiving a flight direction signal, indicative of the momentary flight direction of the UAV, from a source outside of the flight direction indication system 2. For example, the control unit 30 may be coupled to a flight control unit of the UAV for receiving the flight direction signal.

In operation, the control unit 30 controls the light sources 20 of the rotor blades 10 of the four rotors in a coordinated manner. In particular, the control unit 30 provides for a sequence of control commands to the light sources 20, such that their time-selective illumination results in a location-selective illumination along their trajectory during rotation of the rotor blades 10. In this way, the control unit 30 is capable of switching the light sources 20 on/off in such a way that an image is presented to the observer of the UAV by the rotor blades 10. The presented image comprises a flight direction indication to the observer, as will be described below with respect to FIGS. 4 to 7.

Figure 4:
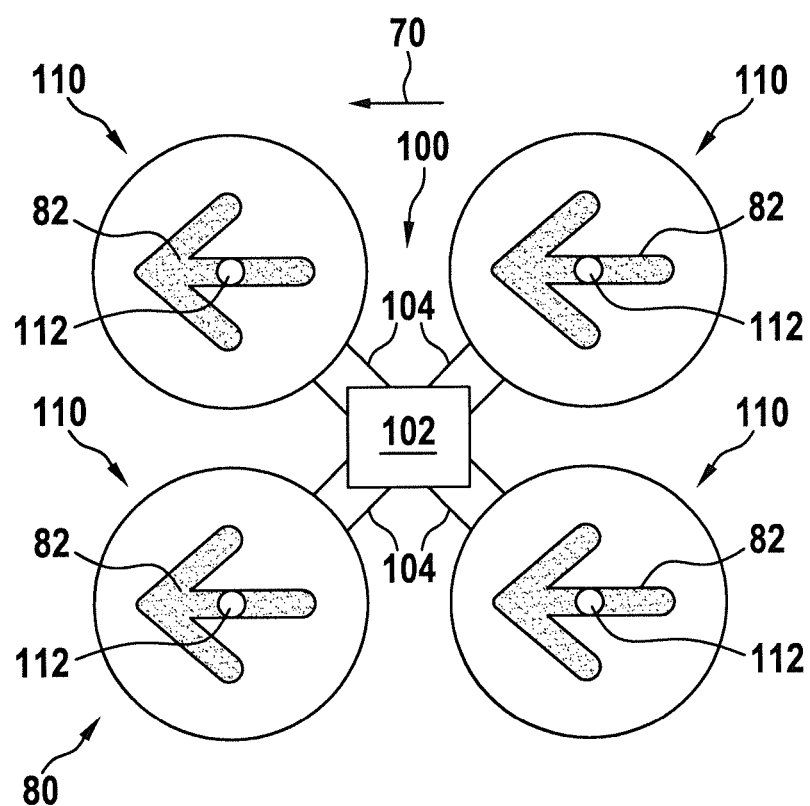
FIG. 4 shows an unmanned aerial vehicle in accordance with an exemplary embodiment of the invention in a schematic bottom view, with the flight direction indication system providing an exemplary flight direction indication.

FIG. 4 shows an unmanned aerial vehicle 100 in accordance with an exemplary embodiment of the invention in operation in a schematic bottom view. The UAV 100 may be the UAV of FIG. 1 and may have the flight direction indication system 2, as described with respect to the block diagram of FIG. 3. The UAV 100 of FIG. 4 is depicted in a bottom view, i.e. in a view as seen from an observer on the ground.

In the depicted operating situation of FIG. 4, the UAV 100 travels into a momentary flight direction 70, as indicated by an arrow on top of FIG. 4. As the UAV 100 is in flight, the rotors 110 are in operation and their rotor blades rotate around the rotor hubs at high speed. For this reason, the rotors 110 are indicated as circles in FIG. 4, representing the outer circumference of the trajectories of the rotor blades.

As described above, the light sources of the rotor blades of the rotors 110 are controlled to light up in a time-selective manner, with the time-selective illumination of the light sources resulting in a location-selective illumination along the trajectory of the rotor blades. In the exemplary embodiment of FIG. 4, the control unit controls the light sources to switch on/off in a way to provide a substantially still image 80 to an observer of the UAV 100. The image 80 has four image parts, with each image part corresponding to the area covered by the trajectory of the rotor blades of the rotor in question. In other words, four sub-images are provided by the four rotors 110 and the sub-images are considered to provide a composite image 80 to the observer of the UAV 100. It is understood that the image 80 does not have a common rectangular form, but rather consists of four circular sub-images.

In the exemplary embodiment of FIG. 4, the image 80 comprises four arrows 82. Each of the arrows 82 is substantially aligned with the momentary flight direction 70. In the exemplary embodiment of FIG. 4, each of the arrows 82 is generated by the light sources of a respective rotor 110. In the exemplary embodiment of FIG. 4, the four arrows 82 are four yellow arrows, i.e. the light sources of the rotor blades of the four rotors 110 emit yellow light when at the positions of the four arrows 82, as indicated in FIG. 4. The emission of yellow light is indicated with a dotted pattern in FIG. 4. The four arrows 82 may also be of a different color, such as white or blue or any other suitable color. It is understood that the sharpness of the contours of the four arrows 82 and the completeness of the yellow illumination within the contours of the four arrows 82 depends of the number of light sources along the radial extension of the rotor blades and the time resolution of the control of the light sources on the rotor blades. With LEDs being small, comparably cheap and quickly switchable light sources, a high accuracy and filling ratio of the contours of the arrows 82 may be achieved.

Figure 5:
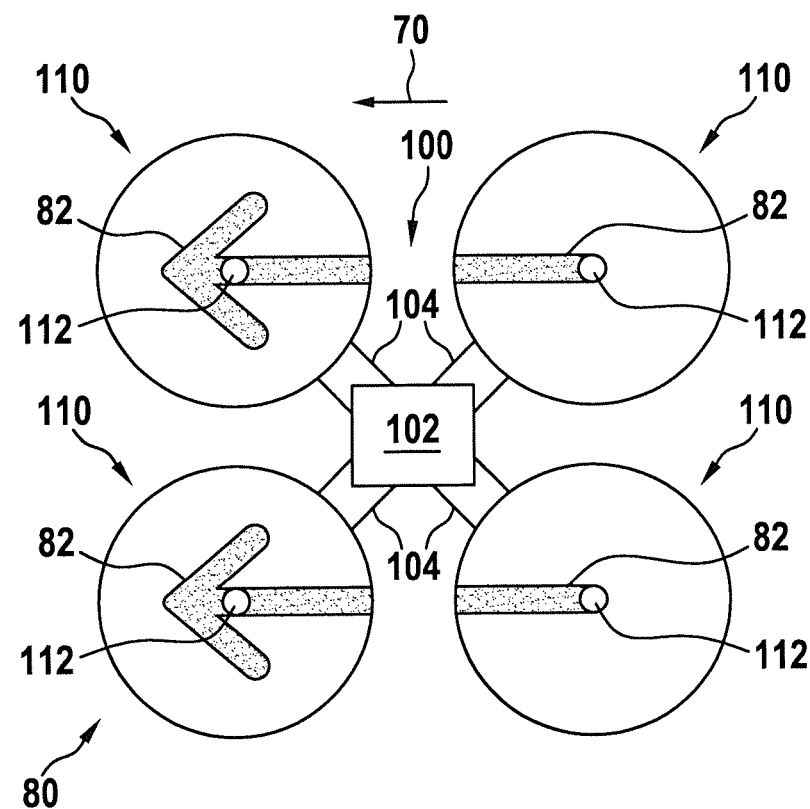
FIG. 5 shows an unmanned aerial vehicle in accordance with an exemplary embodiment of the invention in a schematic bottom view, with the flight direction indication system showing another exemplary flight direction indication.

FIG. 5 shows an unmanned aerial vehicle 100 in accordance with an exemplary embodiment of the invention in operation in a schematic bottom view. As compared to the image 80 of FIG. 4, the image 80 of FIG. 5 has only two arrows 82. Each of the two arrows 82 spans two rotors 110 of the UAV 100. With the control unit being configured to effect a coordinated control of the light sources of all rotor blades, it is made possible that the image components span various rotors 110. In the exemplary embodiment of FIG. 5, the light sources are controlled to provide arrows 82 to the observer that are preceived as composite image elements among two rotors 110, respectively.

FIG. 6 shows an unmanned aerial vehicle 100 in accordance with an exemplary embodiment of the invention in operation in a schematic bottom view. The image 80 of the exemplary embodiment of FIG. 6 differs from the images 80 of FIGS. 4 and 5, as presented to the observer of the UAV 100. In the exemplary embodiment of FIG. 6, three sectors of the image 80 are illuminated in three different colors.

With respect to the momentary flight direction 70, a first sector 84, which is a left forward sector as seen from the observer on the ground, is illuminated in red, indicated with star-like symbols. A second sector 86, which is a right forward sector as seen from an observer on the ground, is illuminated in green, with a triangle pattern indicating the green illumination. A third sector 88, which extends to both sides of a rearward direction of the UAV 100 in view of the momentary flight direction 70, is illuminated in white, which is indicated by a stripe pattern. In this way, the three illumination sectors resemble the navigation lights/position lights of aircraft, as specified for example by the Federal Aviation Regulations (FAR). The first sector 84 may extend in an angular range between 0° and 110° with respect to the momentary flight direction 70 to the left side of the momentary flight direction 70. The second sector 86 may extend in an angular range of between 0° and 110° of the momentary flight direction 70 to the right side of the momentary flight direction 70. The third sector 88 may extend between 0° and 70° towards the right and towards the left of a rearward direction of the UAV 100, i.e. of an inverse direction of the momentary flight direction 70. The angles may be measured with respect to the center of the unmanned aerial vehicle 100 or with respect to the center of the vehicle body 102.

FIG. 7 shows an unmanned aerial vehicle 100 in accordance with an exemplary embodiment of the invention in operation in a schematic bottom view. FIG. 7 illustrates that the color-coded flight direction indication, as described with respect to FIG. 6, may be combined with a symbol-based flight direction indication, as described with respect to FIGS. 4 and 5. In the exemplary embodiment of FIG. 7, parts of the third sector 88 are not illuminated in white, but provide two arrows 82. In this way, the resulting image 80, as seen by the observer on the ground, has three color-coded angular sectors and has two arrows 82 overlaid over one of the color-coded sectors.

It has been described with respect to FIGS. 4 to 7 that the flight direction indications are provided in the form of substantially still images. The control unit may also control the light sources 20 of the rotor blades 10 of the rotors 110 to provide a sequence of images to the observer. For example, the arrows 82 may move in the direction of the momentary flight direction 70 over time. It is also possible that a flashing effect, i.e. a repetitive switching between showing the flight direction indication and not showing the flight direction indication, is provided.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A flight direction indication system for an aerial vehicle having a plurality of rotors, the flight direction indication system comprising:
   for each of the plurality of rotors, at least one rotor blade comprising a plurality of light sources arranged along a radial extension of the rotor blade; and
   a control unit, coupled to the plurality of light sources of the rotor blades of the plurality of rotors;
   wherein the control unit is configured to effect a coordinated control of the plurality of light sources of the rotor blades of the plurality of rotors, with the coordinated control yielding an image or a sequence of images across the plurality of rotors to an observer of the aerial vehicle;
   wherein the control unit is configured to control the plurality of light sources of the rotor blades of the plurality of rotors on the basis of a momentary flight direction of the aerial vehicle, with said image or said sequence of images comprising a flight direction indication, indicative of the momentary flight direction of the aerial vehicle;
   wherein said image comprises a green sector in a right forward direction with respect to the momentary flight direction of the aerial vehicle, a red sector in a left forward direction with respect to the momentary flight direction of the aerial vehicle, and a white sector in a rearward direction with respect to the momentary flight direction of the aerial vehicle; and
   wherein the flight direction system further comprises at least one of a flight direction sensor for detecting the momentary flight direction of the aerial vehicle and a flight direction signal input for receiving a flight direction signal indicative of the momentary flight direction of the aerial vehicle.

2. The flight direction indication system according to claim 1, wherein the plurality of light sources are arranged along more than 50% of the radial extension of the rotor blade.

3. The flight direction indication system according to claim 1, wherein the plurality of light sources are arranged along than 70% of the radial extension of the rotor blade.

4. The flight direction indication system according to claim 1, wherein the plurality of light sources are arranged along between 70% and 90% of the radial extension of the rotor blade.

5. The flight direction indication system according to claim 1, wherein the plurality of light sources comprise light sources of different colors, in particular light sources of at least three different colors.

6. The flight direction indication system according to claim 1, wherein the plurality of light sources are a plurality of LEDs.

7. The flight direction indication system according to claim 1, further comprising:
for each of the plurality of rotors, a blade position sensor for sensing the position of the rotor blade during rotation.

8. The flight direction indication system according to claim 1, wherein the sensors are Hall sensors or optical sensors.

9. The flight direction indication system according to claim 1, wherein the control unit is coupled to the plurality of light sources of the rotor blades of the plurality of rotors via at least one wireless transmission link or via a plurality of sliding contacts.

10. The flight direction indication system according to claim 1, wherein said image comprises at least one arrow, pointing substantially in the momentary flight direction of the aerial vehicle.

11. An aerial vehicle, comprising:
a plurality of rotors; and
a flight direction indication system, comprising:
for each of the plurality of rotors, at least one rotor blade comprising a plurality of light sources arranged along a radial extension of the rotor blade; and
a control unit, coupled to the plurality of light sources of the rotor blades of the plurality of rotors;
wherein the control unit is configured to effect a coordinated control of the plurality of light sources of the rotor blades of the plurality of rotors, with the coordinated control yielding an image or a sequence of images across the plurality of rotors to an observer of the aerial vehicle;
wherein the control unit is configured to control the plurality of light sources of the rotor blades of the plurality of rotors on the basis of a momentary flight direction of the aerial vehicle, with said image or said sequence of images comprising a flight direction indication, indicative of the momentary flight direction of the aerial vehicle;
wherein said image comprises a green sector in a right forward direction with respect to the momentary flight direction of the aerial vehicle, a red sector in a left forward direction with respect to the momentary flight direction of the aerial vehicle, and a white sector in a rearward direction with respect to the momentary flight direction of the aerial vehicle; and
wherein the flight direction system further comprises at least one of a flight direction sensor for detecting the momentary flight direction of the aerial vehicle and a flight direction signal input for receiving a flight direction signal indicative of the momentary flight direction of the aerial vehicle.

12. The aerial vehicle according to claim 11, wherein the plurality rotors includes between 3 and 10 rotors.

13. The aerial vehicle according to claim 11, wherein the plurality rotors includes 4 rotors, 8 rotors or between 4 and 8 rotors.

14. The aerial vehicle according to claim 11, wherein the aerial vehicle is an unmanned aerial vehicle.

15. A method of indicating a momentary flight direction of an aerial vehicle having a plurality of rotors, with each of the plurality of rotors having at least one rotor blade comprising a plurality of light sources arranged along a radial extension of the rotor blade, the method comprising:
at least one of detecting the momentary flight direction of the aerial vehicle with a flight direction sensor and receiving a flight direction signal indicative of the momentary flight direction of the aerial vehicle;
controlling the plurality of light sources of the rotor blades of the plurality of rotors in a coordinated manner, with the coordinated control yielding an image or a sequence of images across the plurality of rotors to an observer of the aerial vehicle; and
controlling the plurality of light sources of the rotor blades of the plurality of rotors on the basis of the momentary flight direction of the aerial vehicle, with said image or said sequence of images comprising a flight direction indication, indicative of the momentary flight direction of the aerial vehicle;
wherein said image comprises a green sector in a right forward direction with respect to the momentary flight direction of the aerial vehicle, a red sector in a left forward direction with respect to the momentary flight direction of the aerial vehicle, and a white sector in a rearward direction with respect to the momentary flight direction of the aerial vehicle.

16. The Method according to claim 15, wherein the plurality of light sources comprise light sources of at least three different colors.

17. The method according to claim 15, wherein said image comprises at least one arrow pointing substantially in the momentary flight direction of the aerial vehicle.

* * * * *